United States Patent [19]

Stenberg

[11] 3,940,305
[45] Feb. 24, 1976

[54] TOOL FOR INTERCONNECTING SHEET WEBS BY WELDING

[75] Inventor: Folke Gustav Adolf Stenberg, Ookungalv, Sweden

[73] Assignee: IWEMA Forpacknings AB, Goteborg, Sweden

[22] Filed: Mar. 14, 1973

[21] Appl. No.: 340,967

[30] Foreign Application Priority Data
Mar. 29, 1972  Sweden.............................. 4071/72

[52] U.S. Cl................ 156/515; 53/182 R; 93/416.1; 156/583
[51] Int. Cl.².......................................... B32B 31/20
[58] Field of Search ........... 156/251, 580, 510, 583, 156/515, 228, 289; 93/416.6; 53/182; 219/243

[56] References Cited
UNITED STATES PATENTS

| | | | |
|---|---|---|---|
| 2,999,532 | 9/1961 | Bursak | 156/583 |
| 3,015,601 | 1/1962 | Fener | 156/515 |
| 3,234,072 | 2/1966 | Sreeben | 156/515 |
| 3,384,528 | 5/1968 | Lehmacher et al. | 156/515 |
| 3,473,995 | 10/1969 | Schott | 156/583 |
| 3,513,052 | 5/1970 | Ariyasu et al. | 156/251 |
| 3,564,810 | 2/1971 | Faletti et al. | 53/182 |
| 3,565,732 | 2/1971 | Colianni | 156/515 |
| 3,574,039 | 4/1971 | Fehr et al. | 156/515 |
| 3,687,789 | 8/1972 | Wheeler | 156/515 |
| 3,775,225 | 11/1973 | Schott | 156/583 |

*Primary Examiner*—Douglas J. Drummond
*Assistant Examiner*—J. J. Gallagher
*Attorney, Agent, or Firm*—Harness, Dickey & Pierce

[57] ABSTRACT

A tool essentially comprising two opposite jaws supporting means to clamp, cut and weld together foil webs. The cutting means is supported on one of the jaws whereas the heating means, and thus the welding surfaces, are provided on the opposite jaw, said welding surfaces being divided by an element having considerably less heat conductivity than the surrounding material forming the welding head proper and having a groove formed therein in which groove the cutting means is received when the jaws are brought into contact with one another during the welding and cutting operations. The arrangement provides for quick and reliable welding and cutting of foil webs without the risk of the foil adhering to the warm welding surfaces and without the need of having to protect these welding surfaces to avoid such adherence. The arrangement likewise enables accurate temperature control at the welding points.

5 Claims, 4 Drawing Figures

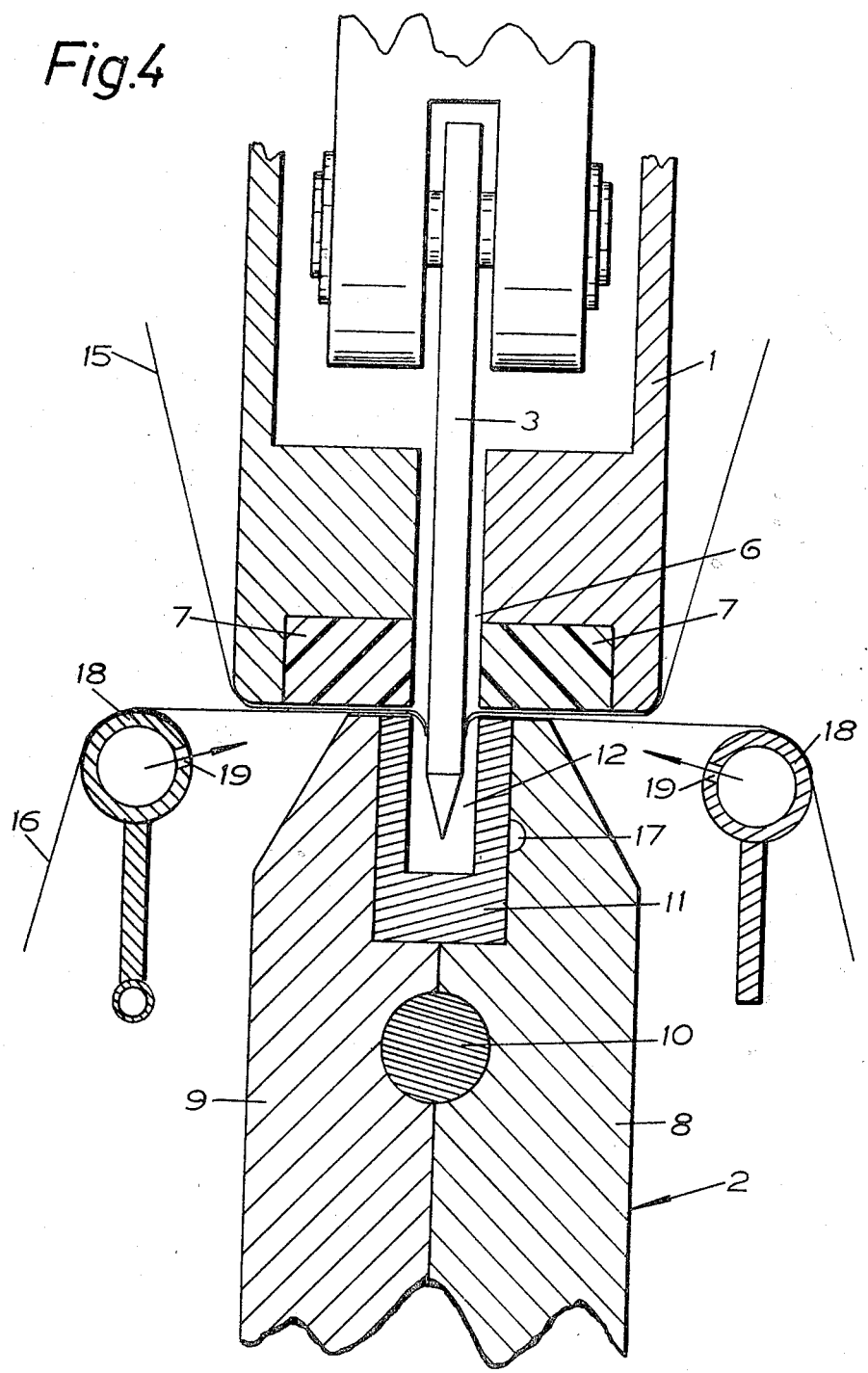

TOOL FOR INTERCONNECTING SHEET WEBS BY WELDING

BACKGROUND OF THE INVENTION

The present invention concerns an improved tool for interconnecting sheet webs by welding, the tool being of the kind comprising two opposite jaws on which are supported means for clamping and cutting the sheet webs and welding them together.

Several kinds of tools are already known for welding together a sheet web enclosing one or several articles. Usually, one jaw of the tool is stationary while the opposite jaw is formed by two collet jaws and by welding heads positioned internally thereof, with some cutting means, e.g. a knife, positioned therebetween.

In accordance with a common, previously known method the welding heads are heated by means of heat wires positioned on the side of the welding heads facing the opposite jaw. To prevent the sheet web parts from adhering or sticking to the welding heads during the welding moment proper the welding wires are covered by a cloth, preferably made from Teflon plastics.

However, a tool constructed in this manner suffers from several disadvantages. The heat wires rapidly wear out and thus must be replaced frequently. This is true also of the Telfon cloth covering the wires. The Teflon plastics, suitable per se for the purpose in view in this connection, still has the disadvantage of being a poor heat conductor. Conssequeantly, the cloth must be thin in order not or prevent heat transfer to the sheet webs to too large an extent and as a result also the cloth wears out rapidly. To eliminate too frequent shutdowns, means have been provided to advance the Teflon cloth successively as it is worn out past the heat wires. Naturally, this arrangement means that the tool becomes more expensive.

Also other disadvantages exist. Although heat wires are used instead of homogeneously heated welding heads it is difficult to insulate the cutting means, for instance a knife, positioned between the welding heads and prevent it from being heated. If the knife becomes too warm it will, however, stick to the sheet web portions during the severing moment, resulting in poor cutting efficiency. In addition, it is not possible to obtain an indication of the temperature of the heat wires directly at the place of welding, which arises problems of regulating the temperature to achieve the best possible welding result.

SUMMARY OF THE PRESENT INVENTION

The present invention is conceived with the aim of simplifying and improving a tool of the above kind in several respects. The inventive object is characterised in that the cutting or severing means is provided in one of the jaws and that a heating body is provided in the opposite jaw, this latter jaw in addition being provided with an inset piece having a groove formed therein to receive the severing or cutting means during the servering operation, said inset piece being positioned level with that side of the second jaw which faces the first jaw, this side forming longitudinal welding surfaces on either side of the inset piece, and in that the inset piece consists of a material possessing considerably less heat conductivity than the material of its associate jaw. A tool manufactured in this manner is considerably more simple and sturdy in structure than tools hitherto known. Consequently, it is more reliable in use than prior-art welding tools.

BRIEF DESCRIPTION OF THE DRAWINGS

The invention will be described more in detail in the following with reference to the accompanying drawings, wherein FIG. 4 illustrates the central portion of the jaws illustrated in FIG. 3 on a still larger scale.

DETAILED DESCRIPTION OF A PREFERRED EMBODIMENT

Figure 1:
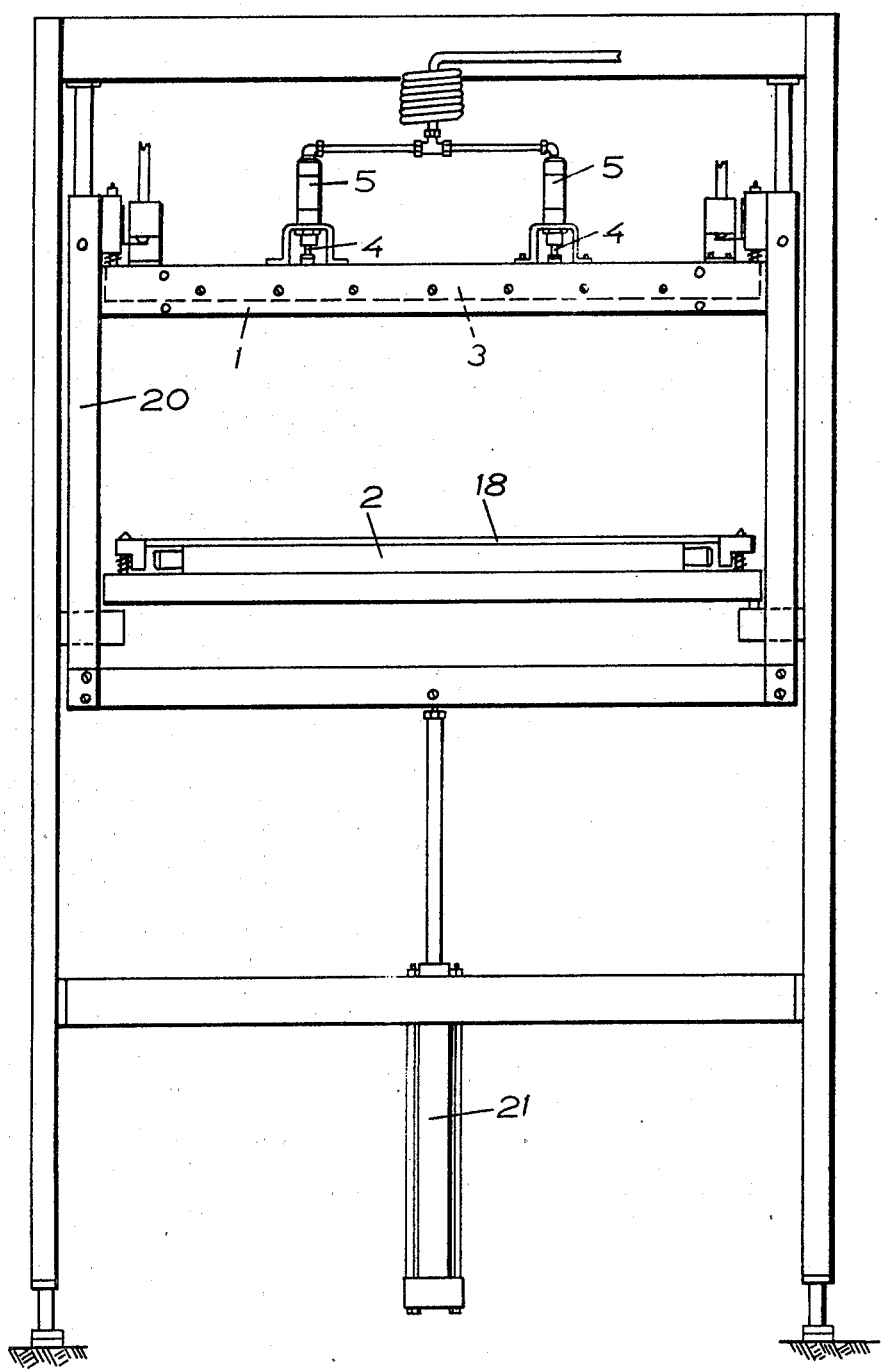
FIG. 1 is a side view of a welding tool in accordance with the invention.

The tool in accordance with the invention comprises an upper jaw 1 and a lower jaw 2. The upper jaw 1 which is cold contains a servering or cutting means, consisting in accordance with the embodiment illustrated of a knife 3. The knife is connected to the piston 4 of a preferably pneumatically operated piston-and-cylinder unit 5. At its bottom portion on either side of a gap 6 for through-passage of the knife 3 the upper jaw is provided with an insert 7, preferably made from silicone rubber and preventing the jaw from sticking to the sheet web portions.

Figure 2:
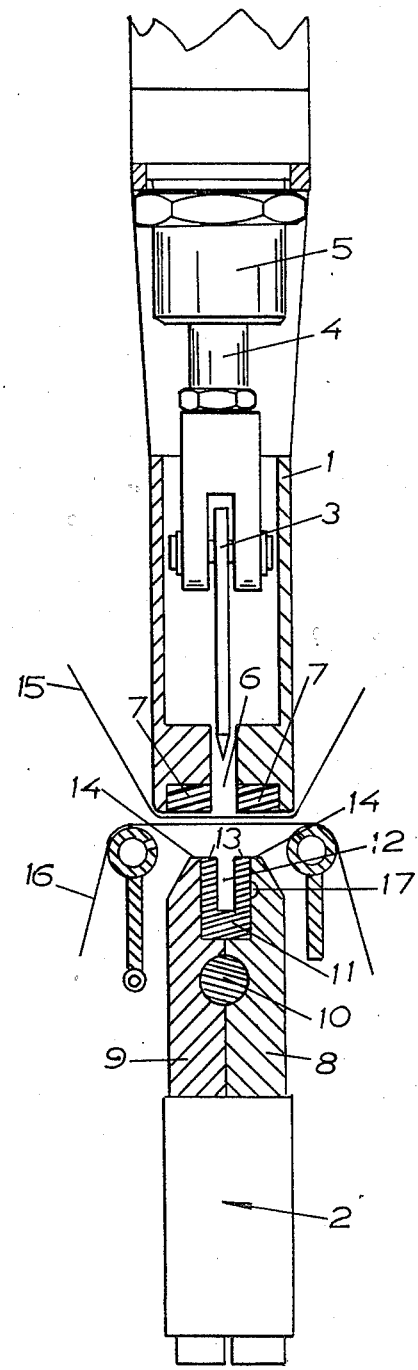

The lower jaw 2, preferably consisting of two halves 8 and 9, comprises a heating body 10 heating the jaw homogeneously. This heating body consists of an ordinary resistor element. In addition, this jaw comprises an inset piece 11. The inset piece 11 is positioned flush with the jaw side facing the upper jaw 1 and is formed with a channel 12 arranged to receive the knife 3 during the severing moment proper. The inset piece 11 consists of a material possessing considerably less heat conducting ability than the material forming the lower jaw 2. Preferably, the inset piece 11 is made from asbestos, or better still, from Telfon plastics. The lower jaw 2 may be made from e.g. aluminium. The two longitudinal surfaces 13 of the inset piece 11 extending on either side of the channel 12 (see FIG. 2) will have a temperature which, on account of the poor heat conductivity of the inset piece will be lower than the temperature of those surfaces 14 of the lower jaw 2 as are positioned flush with the inset piece surfaces 13. By regulating the heating effect to a suitable level sheet web portions 15 and 16, inserted between the jaws 1 and 2, may be kept clamped between the surfaces 13 of the inset piece 11 and corresponding portion of the lower face of the upper jaw 1 while the welding-together of the sheet web portions takes place along the surfaces 14 of the lower jaw 2.

To regulate the heating effect indicator means 17 are preferably provided, such as thermistor sensors, in the border zone between the lower jaw 2 and the inset piece 11.

In accordance with the embodiment illustrated the cross-sectional configuration of the inset piece 11 is U-shaped. However, other shapes are possible, for instance V-shaped cross-section.

On either side of the jaw pair 1, 2 are provided tubes 18 extending along the upper face of the lower jaw and taking part in the movement of the upper jaw over a short distance within the area adjacent the top portion of the lower jaw. The tubes 18 are provided with outlet openings 19 for cooling air.

The lower jaw 2 is stationary. The upper jaw 1 is vertically movable in a frame 20, by means of a preferably pneumatically operated piston-and-cylinder unit 21.

Figure 3:
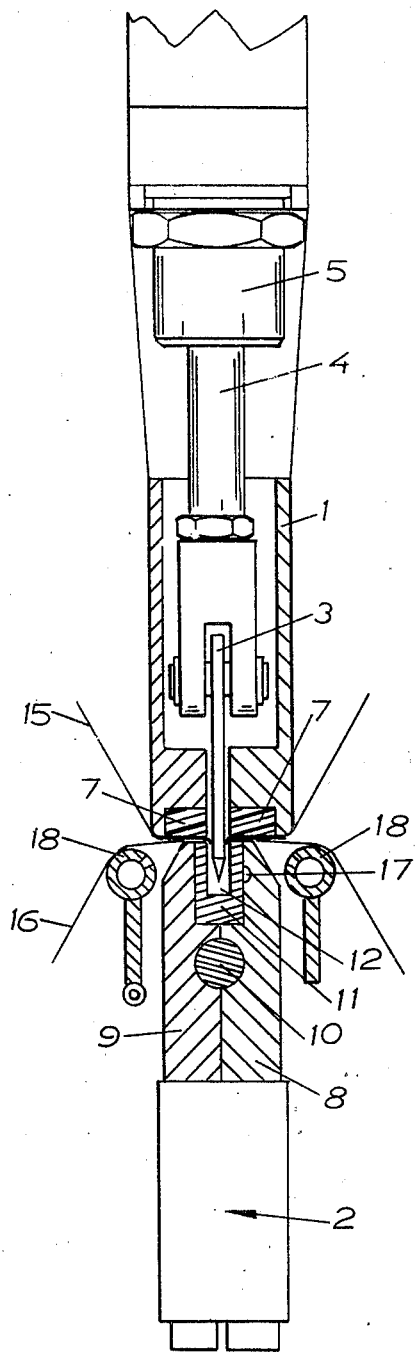
FIGS. 2 and 3 are vertical sections through the two opposite jaws illustrated on an enlarged scale in slightly open and closed postions, respectively.

To enclose articles in a foil or sheet, one proceeds in the following manner. The articles are forwarded horizontally in beteeen the jaws 1 and 2, displacing in front of themselves a vertically extending sheet web which thus forms web portions 15 and 16 behind the articles. When the upper jaw 1 is lowered towards the lower jaw 2, the knife 3 is in its position entirely within the upper jaw. No signal to start the severing activity is issued to the knife 3 until the upper jaw has reached its position adjacent the web portions 15, 16 illustrated in FIG. 3. This is a security feature ensuring that in case someone inadvertently puts his hands between the jaws the distance separating them will remain too wide to initiate the severing moment.

The tubes 18 take part in the displacement of the upper jaw 1 over the last portion of this downward movement, thus permitting the sheet web portions 15, 16 to be clamped between the jaws. This clamping occurs, as mentioned above, between the comparatively cool surfaces 13 of the inset piece 11 and the corresponding portions of the inserts 7 while at the same time the welding procedure starts along the comparatively hot surfaces 14 of the lower jaw 2. The knife 3 is made to move downwards into the channel 12 while severing the sheet web portions 15, 16 and thereafter to again move into the upper jaw 1. When, after completion of the welding procedure this jaw again moves upwards, the tubes 18 move along with it over the first portion of the jaw movement, thus ensuring that the two web portions, having been welded together, are released from the lower jaw 2. At the same time, cooling air is momentarily sprayed out of the apertures 19 in the direction towards the welding points. The upper jaw 1 finally continues to move upwards into its upper position to make it possible to advance new articles between the jaws.

The new tool in accordance with the invention possesses obvious advantages over earlier techniques. The structure is so solid and reliable that there is practically no risk of shut-downs. The inset piece 11 is not subjected to appreciable wear and the heat body 10, because of its position wholly inside the lower jaw 2, requires extremely little servicing compared with constructions of the kind mentioned in the introduction and the servicing costs for this part thus are low. No problem exists of keeping the knife 3 cool. As illustrated by the temperature indicator means 17 the structure also provides excellent possibilities of regulating the amount of heat supplied to this means. The invention also eliminates the need for separate clamping or collet jaws. It thus becomes possible to make very narrow welding seams resulting in considerable material savings. In addition, the welding seam becomes less striking than has hitherto been the case. Whenever the articles are enclosed in a shrinking foil a broad welding seam is inadvantageous in the subsequent shrinking treatment.

The invention is not limited to the embodiment as shown and illustrated above but may be varied in a variety of ways within the scope of the appended claims. The shape and configuration of the inset piece 11 naturally may be different from the one described. Likewise, other materials possessing low coefficients of thermal conductivity are conceivable.

What I claim is:

1. An improved tool for interconnecting sheet webs together by heat welding and for severing the interconnected sheets, said tool comprising two opposite jaws, the first of said jaws being devoid of any heating means and carrying cutting means, the second of said jaws being provided with heating means and being positioned opposite to said first jaw, said second jaw having an opening formed therein adapted to receive said cutting means when said jaws are brought together, an insert piece received in said opening in said second jaw and having a groove therein to receive said cutting means during the cutting operation, said insert piece being positioned level with the side of said second jaw facing said first jaw, said second jaw having side surfaces adjacent said insert piece forming longitudinal welding surfaces on either side of said insert piece, the material of said insert piece being considerably less heat conductive than the material of said second jaw for precluding the transmission of heat from said second jaw to said cutting means.

2. An improved tool as claimed in claim 1, wherein the cross-sectional configuration of said inset piece is U-shaped.

3. An improved tool as claimed in claim 1, wherein the cross-sectional configuration of said inset piece is V-shaped.

4. An improved tool as claimed in claim 1, wherein said second jaw is heated by a heating body, said heating body being enclosed in said second jaw.

5. An improved tool as claimed in claim 1 wherein the insert piece has surfaces on either side of its groove adapted to coact with the first jaw for clamping the sheet webs during the cutting operation.

* * * * *